United States Patent [19]
Babington

[11] Patent Number: 5,975,071
[45] Date of Patent: Nov. 2, 1999

[54] PORTABLE HEATING DEVICE

[76] Inventor: Robert S. Babington, 1113 Ingleside Ave., McLean, Va. 22101

[21] Appl. No.: 09/256,083

[22] Filed: Feb. 24, 1999

Related U.S. Application Data

[63] Continuation-in-part of application No. 08/812,152, Mar. 6, 1997.

[51] Int. Cl.$^6$ ....................................................... F24B 9/00
[52] U.S. Cl. ......................... 126/33; 126/367; 126/350 R; 126/347
[58] Field of Search ............................. 126/33, 344, 347, 126/361, 363, 367, 366, 390, 392, 350 R, 360 R

[56] References Cited

U.S. PATENT DOCUMENTS

| | | | |
|---|---|---|---|
| 1,327,115 | 1/1920 | Robinson | 126/33 |
| 1,430,066 | 9/1922 | Demuth | 126/33 |
| 1,842,062 | 1/1932 | Becker | 126/33 |
| 2,059,953 | 11/1936 | Mayberry | 126/33 |
| 2,207,814 | 7/1940 | Ness et al. | 126/33 |
| 2,231,615 | 2/1941 | Duke | 126/33 |
| 2,525,213 | 10/1950 | Doolin | 126/33 |
| 2,606,339 | 8/1952 | Shaffer et al. | 126/33 |
| 2,679,841 | 8/1954 | Muckler | 126/33 |
| 3,892,945 | 7/1975 | Lerner | 126/437 |
| 5,024,208 | 6/1991 | Hottenroth et al. | 126/25 |
| 5,381,729 | 1/1995 | Hennessy et al. | 126/33 |

OTHER PUBLICATIONS

Technical Manual TM 09211A–14 & P/1, "Manual for The Tray Ration Heating System".

*Primary Examiner*—Larry Jones
*Attorney, Agent, or Firm*—Pollock, Vande Sande & Amernick

[57] ABSTRACT

A portable heating device includes a reservoir having a lid which closes the reservoir during heating. A heat plenum assembly is provided having a firebox disposed underneath the reservoir. The firebox communicates with a burner tube for introducing heat to the lower surface of the reservoir. Tertiary heating of the side walls of the reservoir are provided, as well as heating along the length of the reservoir bottom surface. A deflector at one end of the passage way improves the distribution of tertiary heat by directing heat within the passage way towards each of the corners of the reservoir. A convective air curtain is provided by a doubled walled outer lining which encloses the heat plenum and reservoir. Efficient heat transfer is accomplished between the firebox and reservoir while maintaining the outer surface cool to the touch.

17 Claims, 5 Drawing Sheets

PORTABLE HEATING DEVICE

RELATED APPLICATION

This is a continuation-in-part application of U.S. application Ser. No. 08/812,152, filed Mar. 6, 1997.

BACKGROUND OF THE INVENTION

The present invention relates to portable heating devices for cooking food on a large scale. Specifically, a heating device which is capable of heating up to 30 gallons of water or other liquids under extreme environmental conditions is described.

When responding to natural disasters, such as floods, earthquakes, etc. it is necessary to feed large numbers of people under extreme environmental conditions. These events often require that large numbers of people be fed without the usual conveniences of electric power and fuel.

The military faces similar circumstances in that exercises are conducted in the field without permanent cooking facilities. One technique of cooking utilized on a large scale by the military involves heating prepackaged tray rations of food. Tray rations contain precooked portions of food sealed in a metal or plastic container. When it is time to prepare the food for consumption, the tray rations are inserted in a bath of hot water and heated to a temperature of substantially 190° F. The heating devices for heating the hot water include a reservoir having a heat exchanger immersed in the bottom of the reservoir coupled to a burner. The burner fires into the heat exchanger which in turn heats the water to the necessary temperature.

The conditions under which such tray ration heaters are used often result in significant contamination of the water reservoir. The presence of the heat exchanger in the bottom of the reservoir makes cleaning any such devices very tedious, and in some cases, ineffective depending on the nature of the contamination. The immersed heat exchanger also limits the utility of the device. For example, if the heat exchanger could be removed and hot water maintained within the device without the heat exchanger, the reservoir could be used for cleaning pots, pans, cooking utensils, etc, as well as a cooking vessel.

The tray ration heater must be portable as well as operational under mobile conditions. When a military force is on the move, meals necessarily have to be prepared while the tray ration heater is still in transit. This imposes other conditions on the design of these devices, so that there is no significant spillage or danger to the personnel preparing food using these devices. Further, the tray ration heater must also maintain an exterior temperature cool enough for personnel to touch during operation as well as to be able to move them on and off the mobile vehicle after they have cooked a set of rations without having to wait for the device to cool down.

The present invention is directed to an improved tray ration heater which maintains a sufficiently cool exterior temperature while at the same time providing a large reservoir of hot water without an internal heat exchanger.

SUMMARY OF THE INVENTION

The present invention provides a portable heating device for creating up to 30 gallons of hot water while the device is in transit, as well as when the device is stationary, in extreme temperature and under extreme physical conditions. The portable heating device of the present invention contains no heat exchanger elements in the reservoir, and maintains an exterior temperature cool enough to touch and to permit the device to be picked up and moved after it has been used.

In carrying out the present invention, a completely self-contained burner operated heating system is provided. A water reservoir is disposed within an outer metal liner, and integrally welded along the top of the water reservoir to the outer liner. The outer liner supports a heat plenum disposed below the water reservoir. The heat plenum includes at one end a fire box which has an opening to receive a burner tube. The firebox has a generally curved surface facing the bottom of the reservoir. The primary heating of the reservoir occurs both radiantly and convectively from the flame in the open firebox facing the underside of the reservoir. Adjacent the opposite end of the firebox is an insulated surface which extends from the edge of the firebox to the end of the reservoir. Additional secondary heat is transferred to the reservoir along an exhaust path between the insulated surface and the bottom of the reservoir. The exhaust path extends upwardly along the rear wall of the reservoir to an exhaust pipe extending through the outer liner.

Tertiary heating of the reservoir occurs by virtue of hot gases which escape from holes in the lateral side of the firebox and enter a space between walls of the plenum and the side walls of the reservoir. After the tertiary heating gases heat the side walls of the reservoir, they converge in an upwardly directed exhaust path and exit through the exhaust pipe.

The outside temperature of the device is limited by a convective air curtain which extends between the double walls of the outer lining. Cooling air enters through holes in the bottom of outer liner, between the double walls, and exits through openings or louvers formed in the exterior wall of the liner.

An insulated lid for closing the reservoir is hinged to the outer liner and may be latched closed during a heating operation. A pair of shock mounted skids support the outer liner and hence the entire cooking device can either be placed on the ground or in the back of a vehicle.

The portable heating device is fired by a burner which may utilize any distillate fuel. The flame from the burner is discharged through an opening in the firebox. The main heat reflected from the curved surface, as well as the secondary and tertiary heat flowing under and around the reservoir raise the temperature of the device to a temperature of 190° F., or higher depending on the application, while the exterior of the heating device is maintained at a temperature which is not too hot to the touch.

DESCRIPTION OF THE PREFERRED EMBODIMENT

Figure 1:
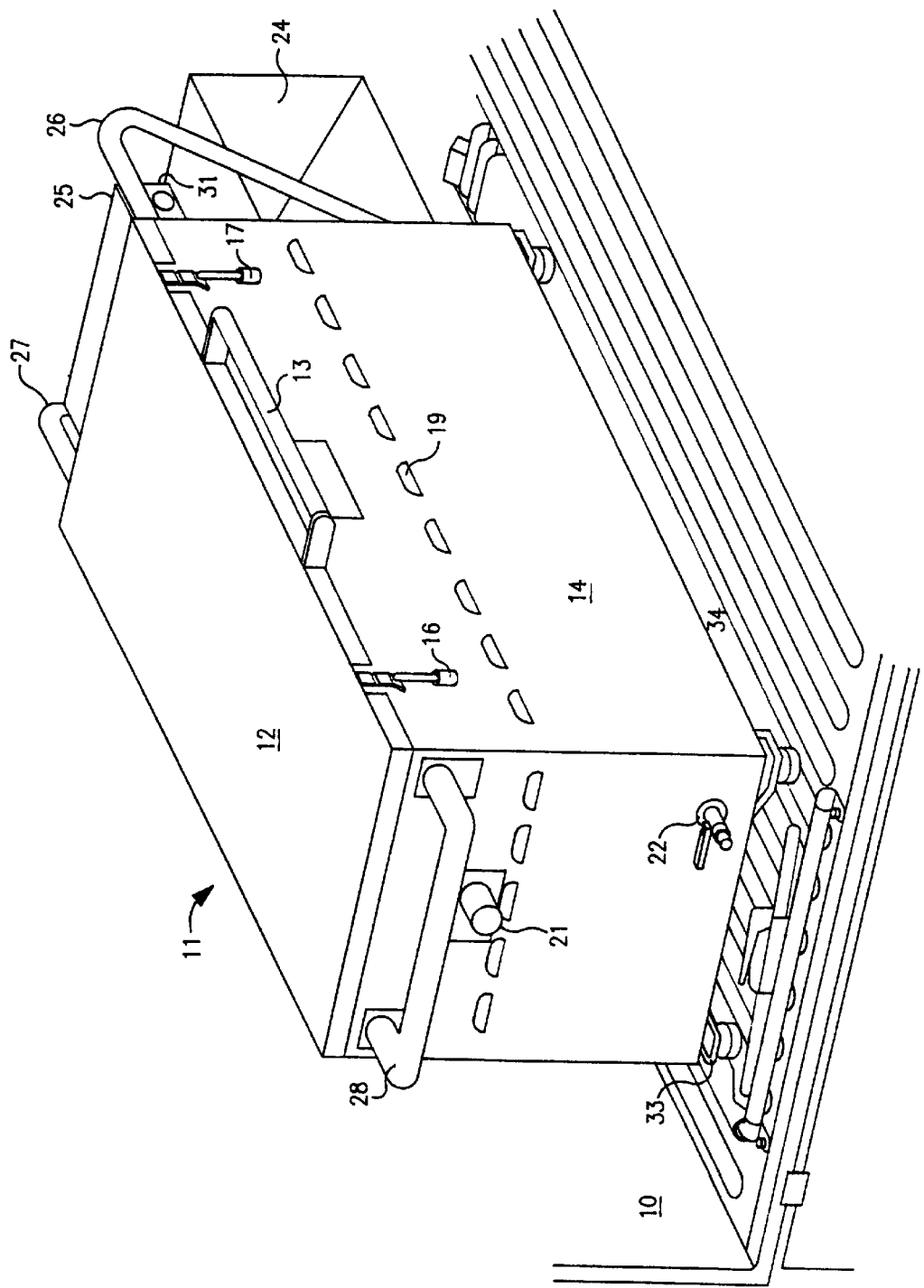
FIG. 1 is a overall perspective view of a portable heating device in accordance with the preferred embodiment of the invention supported in the back of a truck.

Referring now to FIG. 1 there is shown a portable heating device 11 in accordance with a preferred embodiment. The heating device 11 is supported through shock absorbers 33 on a pair of skids 34. The heating device 11 can be operated in transit on a vehicle or placed on the ground for operation. The skids 34 may be advantageously spaced to take advantage of existing mounting structure within a truck bed 10. Handles 28 on the rearward side, and a pair of handles 26 and 27 on the forward side are provided so that the device can be readily moved by two men from the truck bed 10.

Figure 2:
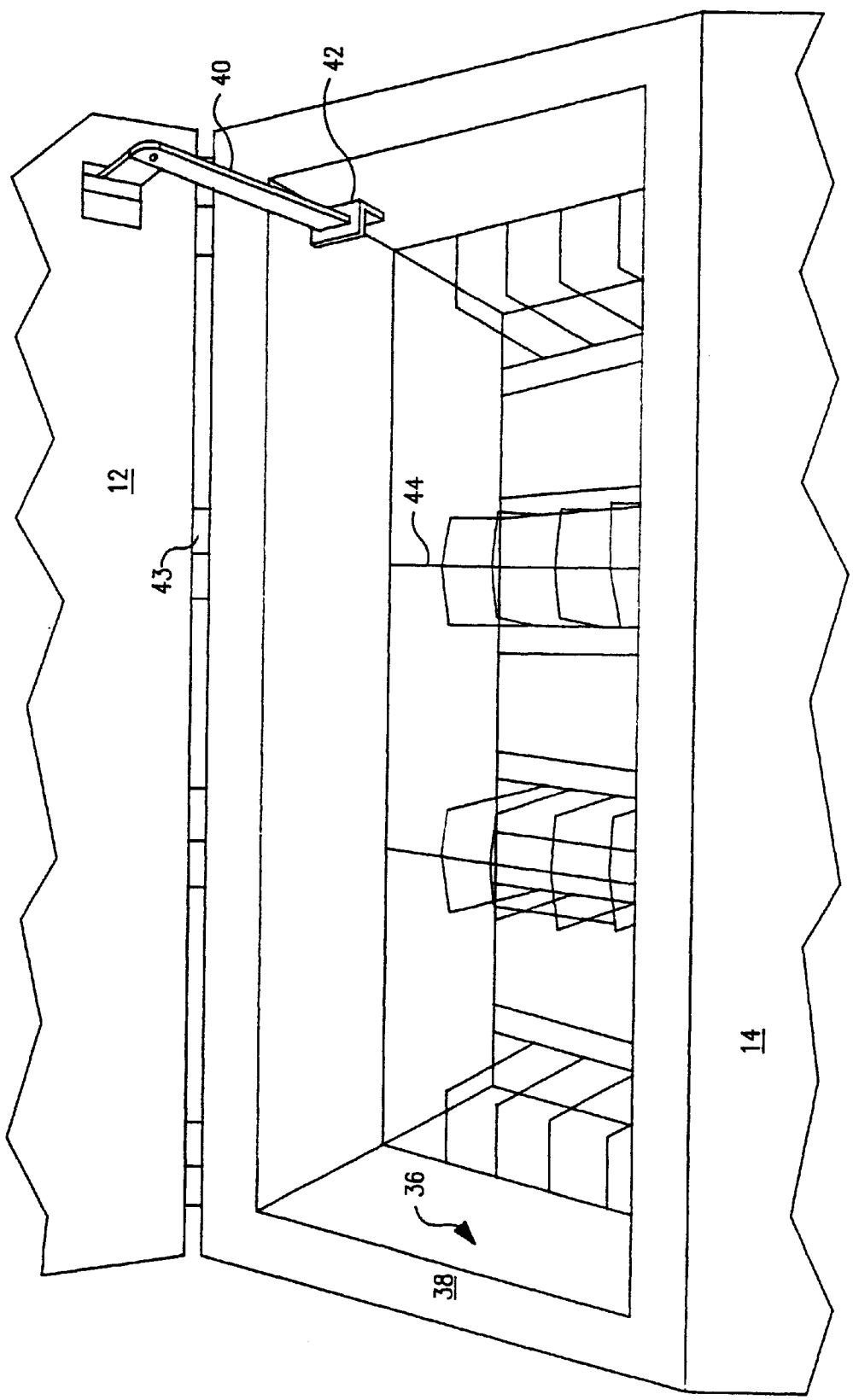
FIG. 2 is a top view of the interior of the hot water reservoir 36 having tray ration supports 44.

As illustrated in FIG. 2, a reservoir 36 is provided underneath an insulated lid 12 containing up to 30 gallons of water. The insulated lid 12 is hinged to the outer liner 14 via hinges 43 and may be raised by a handle 13. A support member 40 pivotally connected to the lid 12 and corresponding support bracket 42 maintain the lid in the open position.

FIG. 2 illustrates a tray ration rack 44 supported on the bottom in the reservoir 36. The tray ration rack 44 may be removed at which point the reservoir 36 is empty and the reservoir 36 may be readily cleaned of all contaminates. The lid additionally includes a pressure relief port to avoid dangerous over pressure and water temperature conditions. The reservoir 36, the lid 12 and outer liner 14 are all of stainless steel construction. Food stuffs other than tray rations may be heated directly within the reservoir 36, or the reservoir 36 may be used to clean any pots or cooking utensils since there are no heat transfer elements or protrusions on the inside of the reservoir 36.

As illustrated in FIG. 1 a plurality of louvered openings 19 are located on the lateral sides of the outer liner 14, as well as on the rear side of the liner adjacent the exhaust 21. As will be evident, these louvers help create an air curtain to maintain the outside temperature of the device sufficiently cool to avoid burning any personnel who may be operating or moving the device.

A drain 22 is shown which permits the water to be drained from the reservoir 36. Latches 16 and 17 on the outer liner 14 cooperate with hold-down members on the lid 12 to clamp the lid 12 closed during a cooking operation.

The portable device is heated by means of a burner assembly 24. The burner assembly 24 is controlled by electronic components in control box 25 having an on/off switch 31 which enables and disables the burner assembly 24. During heating, the burner assembly 24 is under control of both a water level sensor integral in the reservoir 36, as well as a thermostat coupled to the reservoir 36 so that either a low water condition or a excessive temperature will disable the burner assembly 24.

Figure 3:
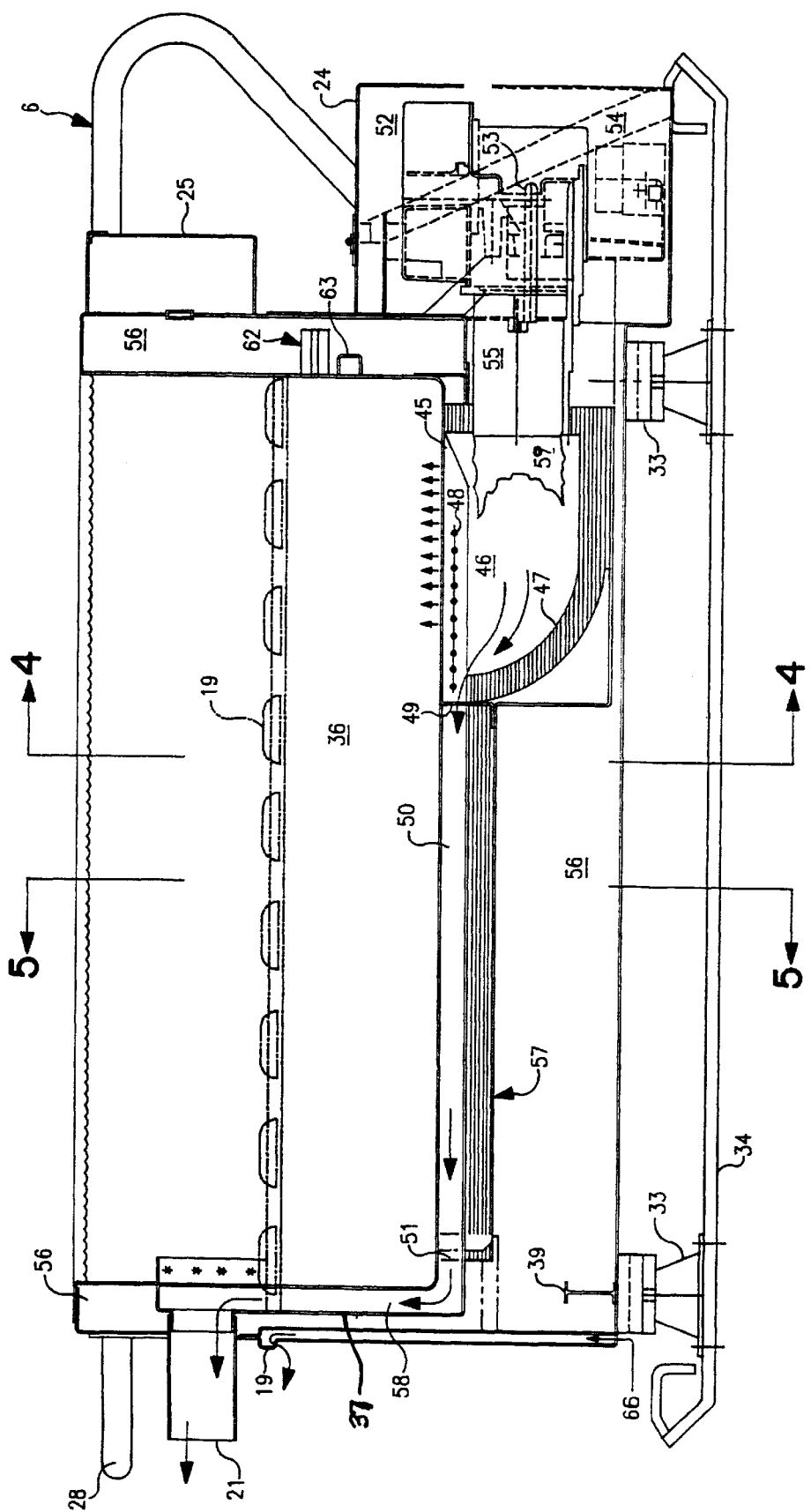
FIG. 3 is a cross-section view of the portable heater of FIG. 1 along the length.

FIG. 3 is section view of the device along its length illustrating how the device is able to heat the large reservoir 36 without having any heat exchanger elements internal to the reservoir 36. The burner assembly 24 includes within it a burner 52 which may be the Babington burner. The burner 52 contains a small internal fuel sump 54. However, burner 52 also draws fuel from any external fuel supply, such as portable 5 gallon fuel can or stationary fuel supply. The burner 52 is supported on a pair of pins 53 contained in the housing for burner assembly 24, which are integral to the outer liner 14. The burner flame tube 55 extends through the outer liner into a firebox 46. The firebox 46 transfers heat from the flame to the reservoir 36. The heat from the flame 59 is radiantly, as well as convectively, released from the firebox 46 the top of which is open facing the underside of the reservoir 36. Reservoir 36 is an inner liner of stainless steel supported above the firebox 46 and welded to the top of the outer liner 14. The firebox 46 includes a generally curved surface 47 which is substantially parabolic for directing the heat incident thereto towards the bottom of the reservoir 36. Secondary heating of the reservoir occurs by virtue of gases escaping through the apertures 49 of the firebox, along a path 50 positioned below the bottom surface of reservoir 36 towards the exhaust pipe 21. The exhaust path 50 includes a refractory board 57 supported to the plenum 37 below reservoir 36, and a deflector 51 at the end of the exhaust path 50. Deflector 51 laterally diverges the exhaust heat towards the corners of the reservoir 36, where they then rise vertically through a passage 58 between the reservoir 36 and plenum 37. The exhaust gases from path 50, and the gases between the path formed by plenum 37 and walls of the reservoir 36, are collected in the passage 58 and exit through the exhaust pipe 21.

Tertiary heat from the firebox 46 escapes through holes 48 along the top of the firebox 46. The escaping heat is captured between a passageway between the outer wall of the reservoir 36 and a wall of plenum 37, until it reaches the end of the inner liner where it merges with passage 58.

A low water sensor 62 is shown connected to the reservoir 36, for detecting the level of water. If the water level is too low the reservoir 36 will overheat, either discoloring it, or in extreme cases, burning through the bottom. A thermal sensor 63 is provided on the front surface of reservoir 36 for sensing the water temperature in the reservoir 36 and controls burner 52 to maintain a selected temperature.

The reservoir 36 and plenum 37 are thoroughly insulated from the outer liner 14 with insulation 56. Due to the extensive insulation 56, as well as the convective air current to be described with respect to the remaining figures, the exterior surface of the heater remains cool enough to touch while at the same time significant heat transfer to the reservoir 36 occurs to effectively raise the temperature of the water to as high as the boiling point. The electronic controls 25 permits selection of the temperature, as measured by sensor 63 to disable the burner 52, thereby insuring against overheating.

Figure 4:
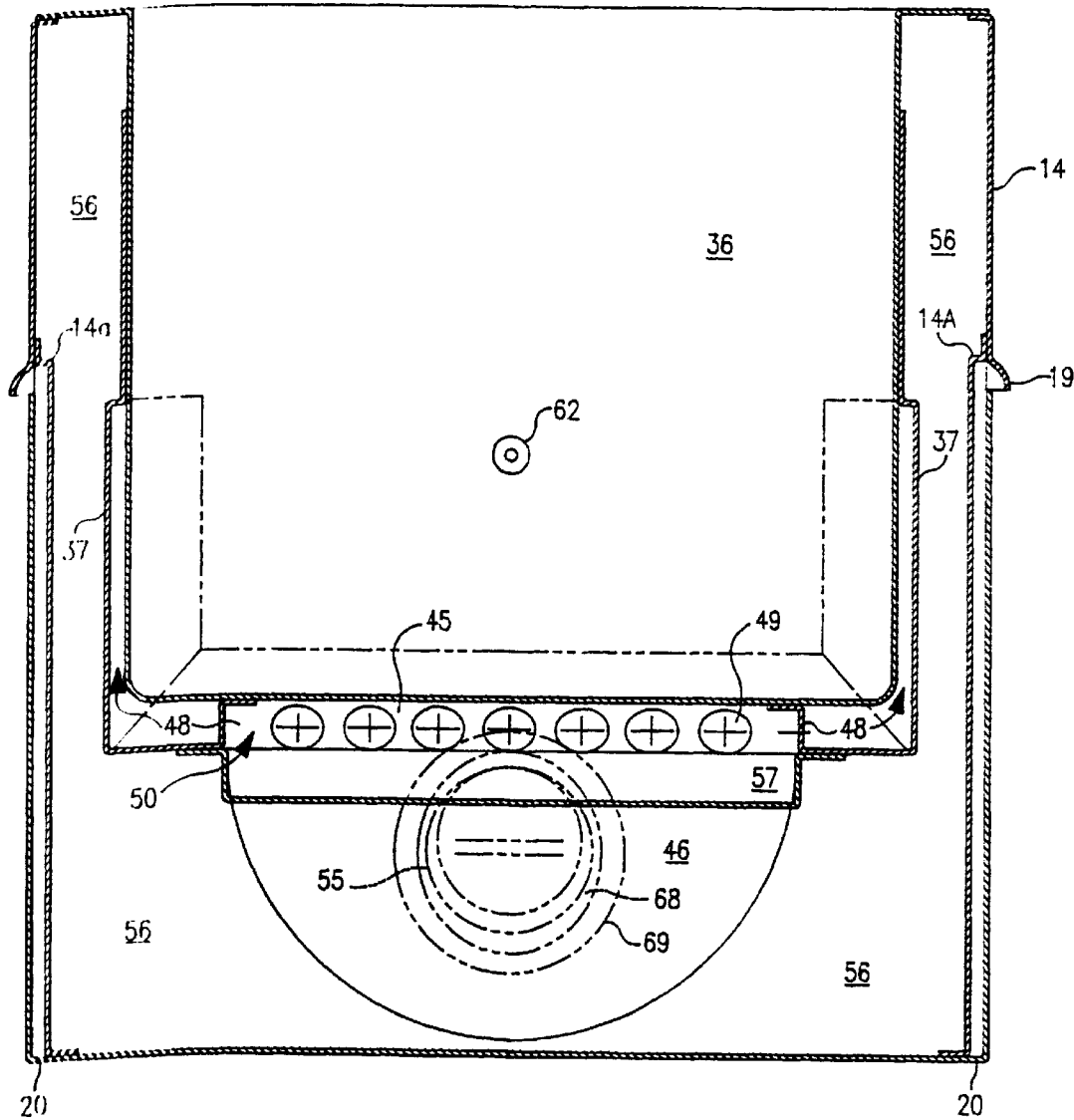
FIG. 4 is a cross-section taken along lines A—A of FIG. 3 of the portable heater showing the heat transfer path from the firebox to the reservoir.
Figure 5:
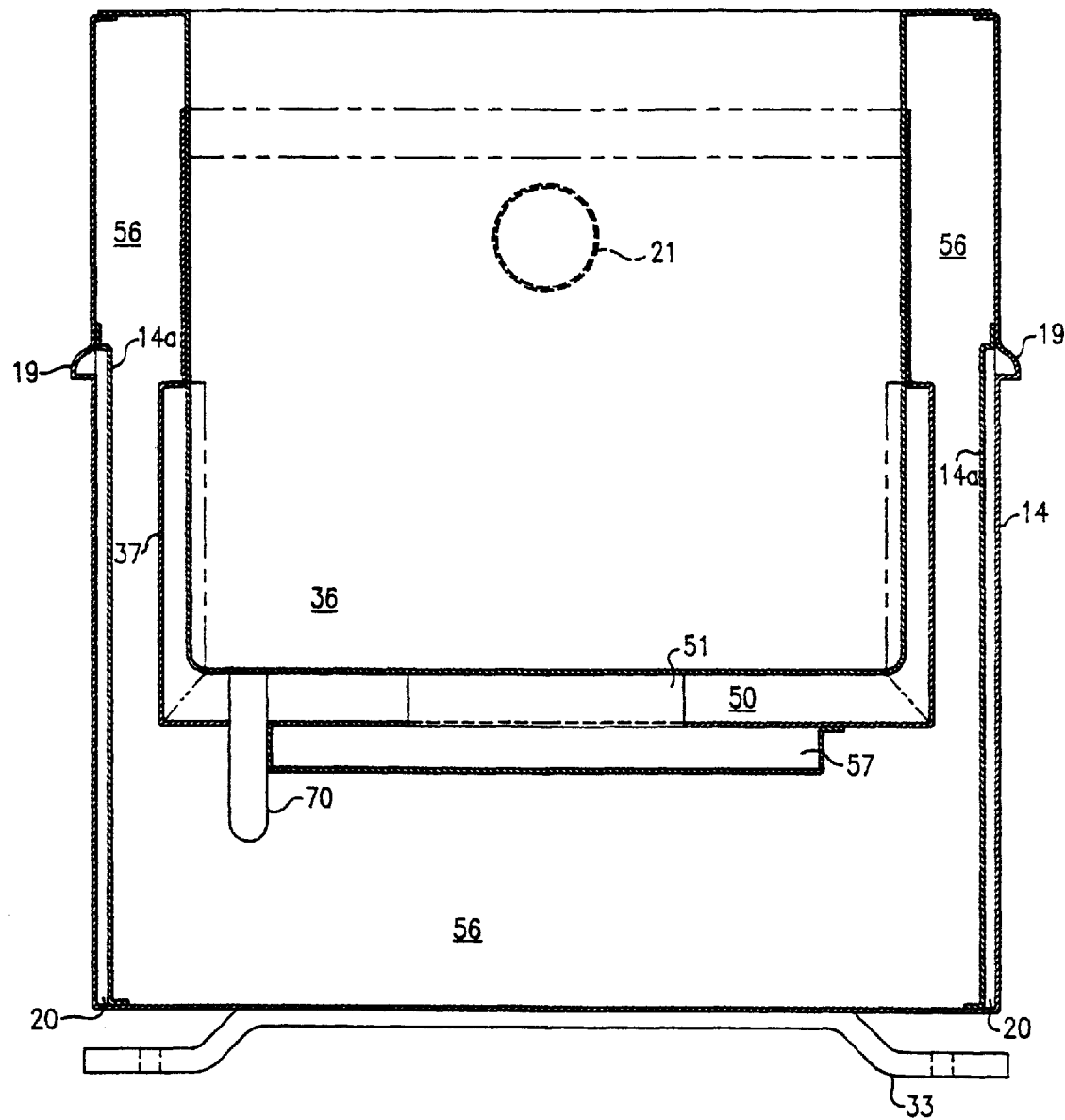
FIG. 5 is a section view taken along lines B—B of FIG. 3 showing the tertiary heat transfer to the reservoir, as well as the convective air curtain between double walls of the outer line.

Referring now to FIGS. 4 and 5, section views A—A and B—B illustrates how the heat transfer occurs between the flame introduced to the firebox 46 and the reservoir 36. Additionally, the convective air curtain is shown maintaining the outside liner 14 cool to the touch.

Turning specifically to FIG. 4, a section view looking towards the burner of firebox 46 and plenum 37 within the outer liner 14 is shown. The firebox 46 is held to the plenum 37 and a 3.5 inch hole 68 in the firebox 46 accepts the burner tube 55. A sleeve member 69 is attached to the outer liner 14 and extends into firebox 46. A flanged end on the sleeve captures the wall of the firebox 46 opening restraining movement of the firebox 46. The opening 68 is offset with respect to the axis of the burner tube 55. Thus, when the burner is slid into place over the positioning pins 53 of FIG. 3, the burner tube 55 is accurately guided into place within the firebox 46. The firebox 46 is preferably formed of an alumina-silica material fitted to a hastalloy frame 45.

The Babington burner 52 has a high static pressure rise. Accordingly, it may be used with modern heat exchangers, which typically have small passageways to permit a high degree of heat transfer, as well as the ability to direct the flow of hot gases in a preferred direction. The combustion air blower in the Babington burner 52 can produce a relatively high static pressure rise. Accordingly, it has the ability to push hot exhaust gases through modern heat exchangers which typically have small passageways to permit a high degree of heat transfer. Stated in different terms, the high static pressure produced within the firebox, in combination with the proper sizing of holes 48 and 49, creates a balanced flow between the secondary and tertiary flow of hot exhaust gases exiting the firebox 46 and insures that the exhaust gases are discharged in a preferred direction.

The primary heat release from firebox 46 is vertical against the bottom of the reservoir 36. Reservoir 36 is efficiently heated from the primary heat, exiting the top of the fire box 46. Secondary heat exits the larger holes 49 of the hastalloy frame 45, towards the rear wall of the plenum 37 through passage 50 heating the bottom of the reservoir. Tertiary heating occurs through a plurality of holes 48 in the hastalloy frame 45, escaping through the holes 48 into the space between the plenum wall 37 and reservoir 36. The smaller holes 48, along the side of the fire box, permit a reduced amount of heat to be distributed along the lateral sides of the reservoir 36. As illustrated in FIG. 3, the lateral side holes 48 are essentially forward of the flame tip 59, to limit the amount of heat escaping toward the front portion of the reservoir 36. In this way, overheating of the reservoir surface containing the heat sensor 63 is avoided, so that an accurate reading of water temperature is possible. Thus, by controlling the relative size of holes 48 to openings 49, the amount of heat distributed between the lateral sides of reservoir 36 and the bottom of reservoir 36, and rear surface thereof is controlled, without distributing excessive heat to the front surface of reservoir 36 bearing the sensor 63.

Insulation 56 is inserted between the plenum 37 and the outer liner 14. The firebox 46 exterior is also insulated with the same insulation material to assist in maintaining the outer liner 14 at a tolerable, noneffensive temperature. A bracket on plenum 37 supports the insulated board 57 to define the bottom surface of the plenum.

A convective air curtain is provided between the lower portion of outer liner 14 and the insulation 56. The outer liner 14 is provided with a doubled wall structure 14a extending from the bottom of the outer liner 14 to approximately two thirds of the way from the top on the sides and rear wall of outer liner 14. The space created between the double wall structure permits air to enter through holes 20 in the bottom, and provides a convective air path from holes 20 to the louver openings 19. A similar double wall structure with louvers 19 is provided on the rear wall of the outer liner 14 to maintain the temperature of the area adjacent the exhaust 21 at a tolerable level. An I beam support 39 (see FIG. 3) is placed adjacent the holes 20 in the bottom of the outer liner to provide support in the area of the holes 20.

As shown in FIG. 5, a drain tube 70 is connected to the bottom of reservoir 36. The drain tube 70 terminates at the valve 22 of FIG. 1 for draining the reservoir 36. FIG. 5 also illustrates a deflector 51 which is important in diverting exhaust in passage way 50 towards the rear corners of the reservoir 36. In this way, the exhaust gas does not occupy a narrow exit path, but is spread laterally to enhance even heating of the bottom of the reservoir 36.

The tertiary heating gases formed between the plenum wall 37 and the reservoir 36 are collected between the end wall of the reservoir 36 and a plenum surface 37. This exhaust path 58 (shown in FIG. 3) directs the gas to an exhaust 21 pipe where it exits the device.

Thus, there has been described a portable heating device which provides a reservoir of hot water to temperatures up to boiling which is self-contained and sufficiently cool along its exterior to permit handling while it is in use. Heat transfer is efficiently conducted to the reservoir 36 without the use of any internal heat exchange elements which interfere with the use of the reservoir 36. While primarily a hot water generating device, other liquids such as cooking oil may be heated using the device in accordance with the invention for such diverse uses as deep fat frying bulk foods. Those skilled in the art will recognize yet other uses for the embodiments as defined by the claims which follow.

What is claimed is:

1. A portable heating device comprising:
   a heat plenum assembly having at one end thereof a fire box communicating with a burner nozzle, said fire box having a generally upwardly facing curved surface, and having an insulating surface extending from an end of said curved surface towards a deflector supported on an opposite end of said plenum;
   an outer liner supporting said heat plenum assembly, including a pair of double walls forming two lateral sides terminating on two opposite end walls, and including a bottom wall, an outer wall of said double walls including openings which in cooperation with holes in said bottom wall between said double walls forming a convective passageway;
   an inner liner forming a liquid reservoir, disposed within said outer liner above said firebox, to receive primary heat, said inner liner being sealed with the top edge of an outer wall of said outer liner, the bottom of said inner liner forming with said insulated surface a passageway for delivering heat from said fire box to an opposite end of said inner liner where it is laterally deflected by said deflector, and then upwardly through a passageway formed between said inner liner and a wall of said plenum to an exhaust port which extends through said outer liner providing secondary heat to said reservoir;
   a lid connected by hinges to said outer liner for closing said inner liner; and
   a pair of support skids connected to said outer liner.

2. The heating device according to claim 1 wherein said plenum is insulated from said outer liner.

3. The heating device according to claim 1 wherein said firebox curved surface is made of an insulated nonmetallic refractory material.

4. The heating device according to claim 1 further comprising water level sensing means for disabling said burner when said water level is below a predetermined minimum.

5. The heating device according to claim 1 wherein said firebox includes lateral openings which transfer heat to a space between said inner liner and a lateral wall of said plenum, transferring tertiary heat to said reservoir along lateral walls of said inner liner.

6. The heating device according to claim 1 further comprising a temperature sensor for sensing the temperature in said reservoir, and means for disabling said burner when said temperature reaches a predetermined level.

7. The heating device according to claim 3 wherein said refractory material is alumina-silica.

8. A portable heating device comprising:
   a heat plenum assembly having at one end thereof a fire box, said fire box open along a top thereof, said firebox having a first and second perpendicular sidewalls having a plurality of openings through which heat escapes;
   said heat plenum having an insulated surface extending from said first sidewall towards an opposite end thereof;
   a burner having a nozzle extending through an opening of a wall of said firebox;
   an outer liner supporting said heat plenum in a bottom thereof, said outer liner having at two lateral double walls and a pair of opposite end walls; and an inner liner disposed within said outer liner forming a liquid reservoir, said inner lining having a bottom which faces said firebox open top;

said bottom and said insulated surface forming an exhaust channel whereby heat from said openings of said firebox first sidewall flows to an end wall of said outer liner, and thence upward between said inner liner and a wall of said plenum to an exhaust opening in said outer liner.

9. The heating device of claim 8 wherein said inner liner forms a second passageway with a wall of said plenum which receives tertiary heat through said openings of said firebox second sidewall.

10. The heating device according to claim 8 wherein said second passageway merges with said first passageway.

11. The heating device according to claim 8 wherein said outer liner includes a first set of openings in said double walls in which air enters, and a second set of openings through which said air exits, forming a convective air curtain for reducing the outside temperature of said heating device.

12. The heating device according to claim 8 wherein said firebox is insulated along the outside thereof.

13. A portable heating device comprising:

an outer liner;

an inner liner within said outer liner forming a reservoir secured to said outer liner;

a heat plenum located inside said outer liner including;
  a fire box at one end of said outer liner, having an open top facing a bottom of said reservoir, said firebox including a first plurality of openings along a front surface and a second plurality of smaller openings along a side surface, said firebox having an insulated interior surface, and an insulated surface extending from said front surface towards an opposite end of said outer liner for conveying hot gasses from said first plurality of openings along an underside of said reservoir towards a rear surface of said plenum and said opposite end of said outer liner to an exhaust tube extending through said outer liner into said plenum; and a burner having a nozzle extending through an opening in a rear surface of said fire box for producing a flame in said fire box which produces direct heat through said open top for directly heating a bottom of said reservoir, said flame producing hot gasses through said first plurality of openings which travels along said reservoir bottom, and producing hot gasses through said second plurality of openings for heating lateral sides of said reservoir.

14. The portable heating device according to claim 13 wherein a balanced flow of heat from said first and second plurality of openings is obtained from a static pressure produced within said fire box.

15. The portable heating device according to claim 13 wherein substantially all of said second plurality of openings are forward of said flame to avoid direct heating of a front surface of said reservoir.

16. The portable heating device according to claim 13 wherein said outer liner includes a double wall on at least first and second sides of said liner, said double wall including an air passage way forming a convective air curtain to reduce the outer temperature of said outer liner.

17. The portable heating device according to claim 13 wherein said firebox has a curved inner surface facing said reservoir bottom surface.

* * * * *